United States Patent
Parone

[15] 3,698,090
[45] Oct. 17, 1972

[54] MICROMETER BACKLASH ADJUSTMENT DEVICE

[72] Inventor: Anthony D. Parone, Elmwood, Conn.

[73] Assignee: Pratt & Whitney Inc., West Hartford, Conn.

[22] Filed: Jan. 13, 1971

[21] Appl. No.: 106,002

[52] U.S. Cl. .............................................. 33/164 R
[51] Int. Cl. ................................................ G01b 3/18
[58] Field of Search .................. 74/441; 33/164, 163

[56] References Cited

FOREIGN PATENTS OR APPLICATIONS

| 1,006,386 | 1/1952 | France | 33/164 R |
| 457,877 | 6/1968 | Switzerland | 33/164 R |

OTHER PUBLICATIONS

Product Engineering, " Eliminating Backlash in Lead Screws" July 1939 page 302

Primary Examiner—Harry N. Haroian
Attorney—R. W. Luther

[57] ABSTRACT

A micrometer embodies an assembly to control the engagement between an annular plastic structure and the threads of a spindle for adjusting the play and backlash between these parts. A compression nut is threadingly secured to the body of a micrometer such that it may be adjusted to compress the plastic structure to control the engaging contact between the threads of the plastic structure and the micrometer spindle.

2 Claims, 4 Drawing Figures

PATENTED OCT 17 1972

3,698,090

INVENTOR.
ANTHONY D. PARONE

BY
Radford W. Luther
ATTORNEY

MICROMETER BACKLASH ADJUSTMENT DEVICE

BACKGROUND OF THE INVENTION

This invention relates to devices which control the backlash in threaded assemblies. The invention also relates to micrometers, and more particularly to subassemblies which control the play or backlash of the micrometer spindle.

Small variations in the thread form of a micrometer spindle frequently occur during manufacture of the spindle, and although such variations have a minor effect, if any, on the measuring accuracy of the micrometer, they do affect the smooth rotation and true running of the spindle in the micrometer or other mating threads due to the qualify of fit between the parts.

In the past, the micrometer spindle has been threadingly inserted into a metallic split nut and various devices have been employed to cam the metallic split nut into threaded engagement with the spindle to control the resilient pressure engagement between the respective threads thereof. A prominent drawback of these prior art devices is that they tend to be relatively complex, and this complexity significantly contributes to the cost of manufacturing a micrometer. Also, the utilization of such a metallic split nut does not insure uniform contact between the nut threads and the spindle threads which is necessary for the smooth and true running of the spindle in the micrometer nut.

SUMMARY OF THE INVENTION

Compressible materials, such as nylon, Teflon and other plastics, can be compressed for sustained periods of time, and if released from such compression these materials will slowly resume their original shapes. Such plastic materials are characterized in that they expand at right angles to the direction of the compressive force.

One embodiment of the invention employs this phenomenon by providing a confined plastic nut in threaded engagement with a spindle. Axial compression of the nut causes a radial expansion of the nut which, in turn, allows the threads of the nut to conform to the void around the threads of the spindle. A device according to the invention is advantageous over prior art devices not only due to its lower manufacturing cost, but also because it provides for smoother operation of the spindle as the plastic nut more nearly engages 100 percent of the bearing surface on the spindle threads. Moreover, because of the friction encountered between the interengaging threads, a device in accordance with this embodiment of the invention will inherently possess a long service life. This embodiment of the invention is not limited to micrometers, but is applicable to any precision screw assembly wherein there is a need to control the backlash and/or radial play.

Another embodiment of the invention employs an untreaded plastic structure disposed between a fixed threaded surface and a metallic spindle nut. A force exerted axially on the metallic spindle nut in the direction of the spindle's axis will produce a more pronounced engagement between the threads of the spindle and those of the metallic nut and will axially compress the plastic annulus. This embodiment of the invention is similarly applicable to any precision screw assembly and is advantageous over prior art devices and maintains correct alignment of the threaded spindle.

It is a primary object of my invention to provide a precision screw assembly having an effective means to control the backlash and/or radial play.

Another object is to provide a precision screw assembly with smooth and true running characteristics.

Still another object is the provision of a precision screw assembly adjustment which requires a minimum number of individual parts and which, therefore, is simple and economical to manufacture.

A further object is to provide a micrometer having a simple and effective means to adjust the backlash and/or radial play therein which promotes smooth and true running of the micrometer spindle.

A still further object of this invention is to provide a micrometer construction embodying a plastic member adapted to be compressed for controlling the backlash and/or radial play therein.

Other objects, features and advantages of the invention will be apparent as the description thereof proceeds, when considered in connection with the accompanying illustrative drawings.

DETAILED DESCRIPTION OF PREFERRED EMBODIMENTS

Figure 1:
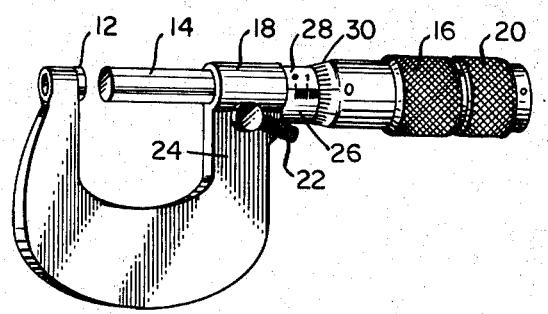
FIG. 1 is a side elevational view of the micrometer embodying the instant invention.

Referring now to the drawings, wherein like characters are used throughout to designate like elements, the illustrative precision screw assembly is a micrometer of the C type and includes an anvil 12, a spindle 14, a thimble 16 and a housing 18. The rear, or right end of the spindle 14 is tightly secured to the thimble for rotation therewith by means of a cap 20. The micrometer also includes a spindle lock 22, mounted within the frame portion 24 of the housing 18 for preventing movement of the spindle after the desired measurement has been completed. A tubular portion 26 of the housing 18 and the left or front end of the thimble 16 are graduated at 28 and 30 in the usual manner, as will be seen clearly in FIG. 1.

Figure 2:
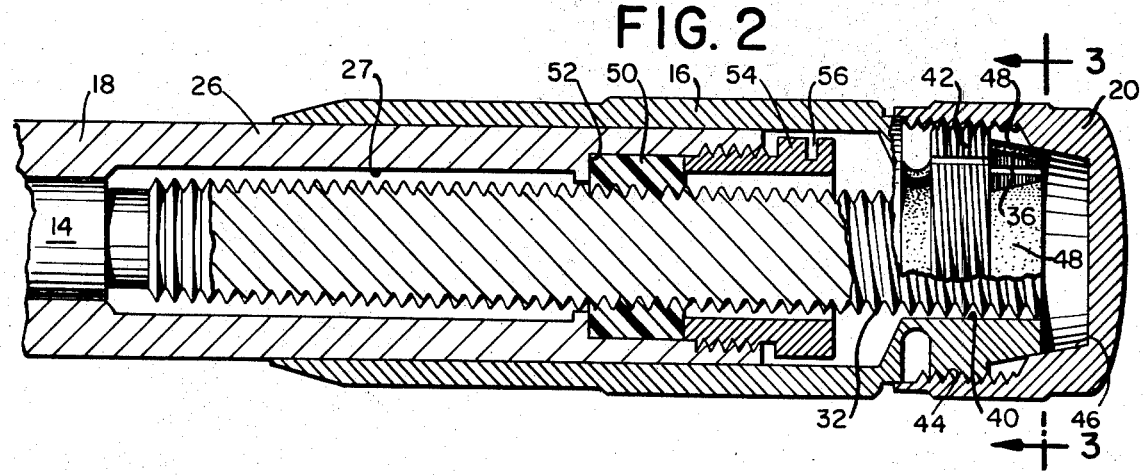
FIG. 2 is an enlarged fragmentary sectional elevational view showing the spindle and thimble assembly.
Figure 3:
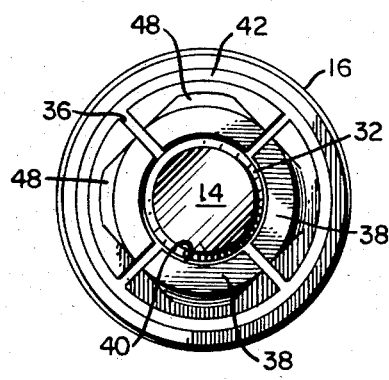
FIG. 3 is a view of the micrometer of FIG. 2, with the cap removed, taken along the line 3—3 of FIG. 2.

As can best be seen in FIGS. 2 and 3, the tubular portion 26 of the housing 18 is coaxial with the spindle 14 and the thimble 16 which is movable thereover. The end portion 34 of the thimble 16 is radially slotted at 36 to form plurality of segments 38, and has a smooth interior surface 40 which moves radially into engagement with the rear threads on the spindle's threaded portion 32 when cap 20 is tightened. It will be appreciated that the end portion 34 of the thimble 16 is secured to the spindle 22 in a manner resembling that of a chuck in a drill. It should also be noted that the radial slots 36 in the end portion 34 of the thimble 16 extend from the rear end of the thimble to just adjacent the terminus of the threads 42. The interior of the cap 20 is also provided with threads 44 to engage the threads 42 of the thimble. As the cap 20 is rotated to fixedly secure the spindle 14 to the thimble 16, the tapering wall 46 of the cap 20 engages the tapering curved surfaces 48 on the end portion 34 to establish firm engagement between the threads of threaded portion 32 and the surface 40, thereby immovably mounting the spindle 14 within the thimble 16 such that the spindle 14, thimble 16 and the cap 20 define a rigid body which rotates when a torque is applied to either of the respective knurled surfaces of the thimble and cap. It should be apparent that the spindle 14 must be accurately positioned with respect to the thimble 16 before the cap is tightened so that the micrometer reads 0 when the left end of the spindle 14 contacts the anvil 12.

An annular structure 50, made of a compressible material such as nylon, Teflon or other plastic material, has threads formed on the interior surface thereof, to thereby define a compressible nut which is mounted within the housing 18 such that its outer periphery is contiguous with the wall of the chamber 27, and the lateral side is contiguous with an annular abutment 52. The structure 50 threadably engages the threaded portion 32 of spindle 14. A compression nut 54, which threadably engages the interior of the tubular portion 26, bears against the other lateral side of the structure 50. The compression nut 54 is slotted at 56 in the usual manner to receive a wrench so that the nut 54 may be adjusted forwardly and rearwardly to vary the degree of compression of the structure 50.

It will be appreciated that a sufficient forward adjustment of the compression nut 54 will permit the interior threads of the structure 50 to fill the voids between the threads on the spindle and effect bearing contact therebetween. It should also be obvious that the torque required to turn the spindle will correspondingly increase as the nut 54 is moved forwardly. It should now be apparent that the structure 50 and compression nut 54 form a subassembly which holds the threads of the structure 50 in predetermined resilient threaded engagement with the spindle 14. This substantially constant resilient pressure between the threads of the structure 50 and the spindle allows the threads of the structure 50 to automatically closely engage and follow the spindle threads along their entire length, and thus enables the structure 50 to conform to any slight irregularity in the threads of the spindle. Moreover, such engagement between the structure and spindle furnishes automatic compensation for irregularities which may exist in the diameter of the spindle, thereby forestalling the possibility of a backlash, which might otherwise be occasioned.

It will be appreciated that a subassembly as defined by structure 50 and compression nut 54 can provide for smooth operation of a micrometer or, for that matter, any other precision screw assembly. Also, it will be noted that the subassembly requires only two inexpensive parts and is therefore simple and economical to manufacture and assemble. The wear characteristics of such a subassembly also render the micrometer relatively durable and longlasting. An important advantage obtainable when using a compressible plastic type annulus, according to the invention, is the obviation of the provision of a cam surface upon the annulus 50.

Figure 4:
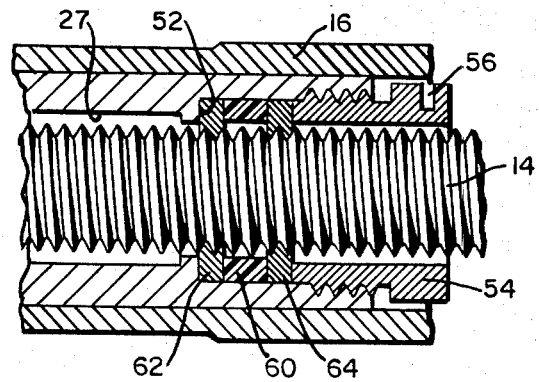
FIG. 4 is an enlarged fragmentary sectional elevational view showing a spindle and thimble arrangement according to another embodiment of the invention.

Turning now to FIG. 4, wherein there is shown another embodiment of the invention, it will be seen that the subassembly of FIG. 2 can be modified by replacing the structure 50 with an unthreaded compressible annular structure 60, which may be made of a plastic material, interposed between metallic nuts 62 and 64, each of which threadably engages the spindle 14 along the threaded portion 32. This embodiment is adapted to be utilized when it is desired to have the spindle 14 in threaded engagement with a metallic part, as opposed to a compressible part, such as that shown in 50 of FIG. 2.

Rotating the compression nut 54 to produce a forward displacement thereof, produces a corresponding slight displacement of the metallic nut 64 against the resilient urging of the plastic annular structure 60, thereby increasing the pressure between the respective threads of the spindle and the nuts 62 and 64 and preventing the development of any backlash in the spindle 14, as was the case in the embodiment of FIG. 2. The position of the compression nut 56 similarly determines the torque required to rotate the spindle 14. It will be noted that the metallic nut 62 is immobilized within the housing 18 by abutment 52 and the lateral side of the annulus 60, so that as the compression nut 54 is moved forwardly, the spindle 14 will be in tighter threaded engagement with both the nut 64 and the nut 62. Hence, forward rotation of compression nut 54 results in an increased bearing contact between the right faces of the threads of spindle 14 and the threaded portion of nut 64 and the left faces of the threads of the spindle 14 and the threads of nut 62. Obviously, if desired, nut 62 could be replaced by permanent threads in the housing.

It will be appreciated that a basic difference exists between the embodiments and FIGS. 2 and 4 in that FIG. 2 the threads guiding the spindle are radially urged into a close bearing fit therewith, whereas in FIG. 4 the threads guiding the spindle are laterally urged into a close bearing fit therewith. Hence, while the subassembly in the embodiment of FIG. 2 is best suited for some applications, the subassembly of FIG. 4 would be preferable in other applications – notably those where threaded engagement between metal parts is desirable.

While there is shown and described herein a micrometer structure embodying the invention, it will be manifest to those skilled in the art that the invention could be embodied in any precision screw assembly, and that various modifications and rearrangements of the parts may be made without departing from the scope and spirit of the underlying inventive concept, and that the same is not limited to the particular forms herein shown and described, except insofar as indicated by the scope of the appended claims. For example, while the plastic structures have been shown as annuli, they could embody conical or irregular shapes and be seated in appropriately contoured chambers. Furthermore, if desired, the plastic structures could be split, as a split nut, irrespective of the selected configuration. Obviously, the chosen application will require that the plastic structure be shaped so as to facilitate adjustment thereof.

I claim:

1. In a precision screw assembly, the combination comprising:
    a housing having a chamber therein;
    a threaded spindle extending through the housing within the chamber thereof;

a nut, made of a compressible plastic material, threadably mounted upon the spindle in coaxial relationship thereto;

abutment means in the housing to contact a side of the nut and prevent axial movement thereof; and means for exerting an axial force on the other side of the nut to axially compress the nut such that the nut undergoes a radial expansion without an inward displacement of its outer periphery, thereby causing the threads of the nut to more completely fill the voids between the threads on the spindle.

2. The combination of claim 1, wherein the axial force exerting means comprises:

a compression nut having exterior threads coaxially arranged with respect to the spindle;

and wherein the housing comprises:

interior threads on the wall of the chamber, the exterior threads of the compression nut engaging the interior threads of the housing.

* * * * *